Dec. 6, 1927.
W. R. MYERS
1,651,725
STOCK FOOD PREPARING AND FEEDING APPARATUS
Filed Dec. 17, 1925   2 Sheets-Sheet 1
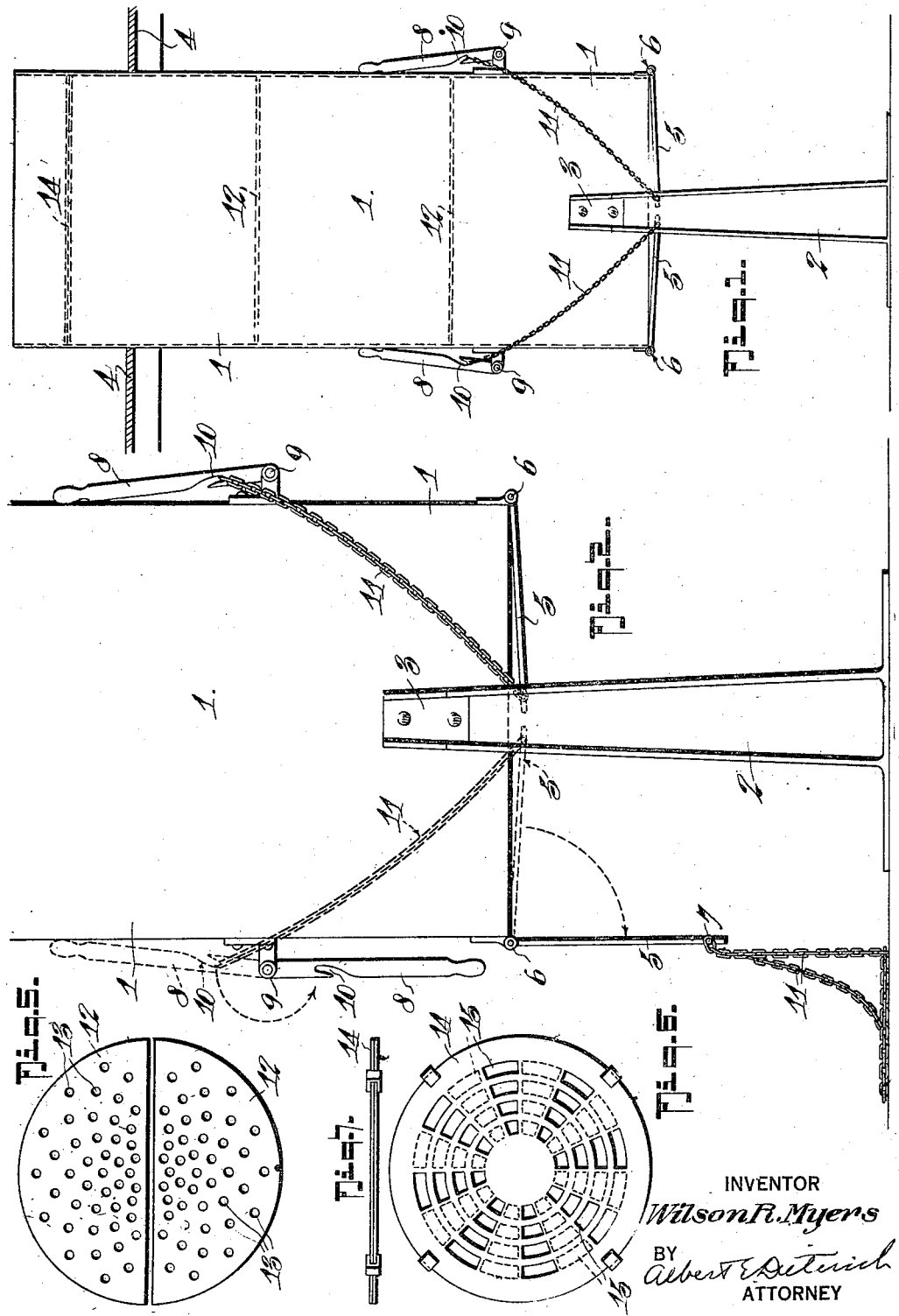
INVENTOR
Wilson R. Myers
BY
ATTORNEY

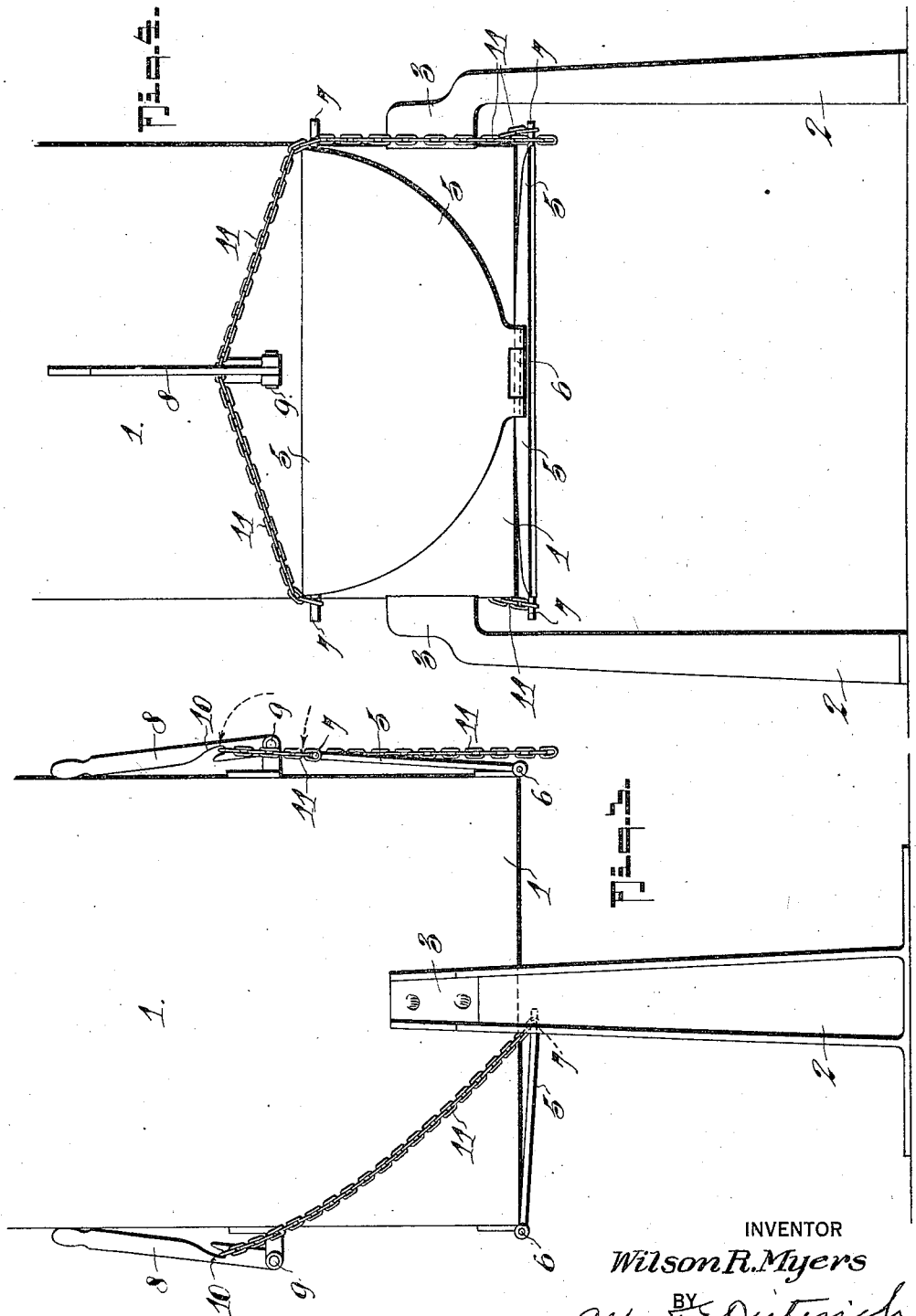

Patented Dec. 6, 1927.

1,651,725

UNITED STATES PATENT OFFICE.

WILSON R. MYERS, OF PORTLAND, OREGON.

STOCK-FOOD PREPARING AND FEEDING APPARATUS.

Application filed December 17, 1925. Serial No. 76,035.

The invention generally relates to stock food preparing and feeding apparatus of the class wherein is provided a vertical tube-like receptacle into which the food is stored and compacted after being suitably moistened with a "converter" solution so that heat is generated in the compacted mass and fermentation takes place effecting a substantial predigestion of the food before it is delivered from the bottom end of the tube for distribution to the feeding stock.

In my application for patent Serial No. 45,126, filed July 21, 1925, I described a known apparatus of the type above mentioned in which was employed a vertical tube open at upper and lower ends and into which the food was stored, then sprayed as effectively as possible with a converter liquid, and compacted by the aid of a heavy weight lowered into the upper end of the tube. This apparatus and method of using the same presented great difficulties due to the fact that the mass could not be uniformly moistened and because of the necessity of using the cumbersome compacting weight.

The application referred to disclosed an apparatus for effectively overcoming the difficulties mentioned and provided for uniform moistening of the mass and delivery of the same into the tube in such a manner that necessity for the compacting weight was eliminated.

It has also been experienced that air coursing through the tube and mass has a great share in the process of predigestion of the food and that to obtain the best results just the right amount of air should be permitted to circulate—just enough to provide the desired aeration without undesirable cooling effect. The prepared food being fed from the open bottom of the tube it was still further found difficult and dangerous to provide for proper discharge thereof from said tube end and for holding the mass weight in the tube when not desirable to discharge the same from the lower open end of the tube for feeding.

Therefore it is the object of my present invention to provide a tube for receiving the food mass which has provision for releasably supporting the mass in the tube and for providing for suitable air circulation through the mass, the said supporting means being so constructed as to be wholly or partially releasable safely and easily at will.

With the above and other objects in view that will hereinafter appear, the invention further resides in the novel details of construction, combination and arrangement of parts, all of which will be first fully described, then be particularly pointed out in the appended claims, reference being had to the accompanying drawings, in which:—

Figure 1 is a side elevation illustrating my invention in use, parts being shown in section.

Figure 2 is an enlarged side elevation of the lower end of the tube, one bottom closure gate half being shown open and one closed.

Figure 3 is a view similar to Figure 2, one gate half being shown closed and one open and fastened up out of the way.

Figure 4 is a view similar to Figure 3 looking at the tube so as to centralize the lever position.

Figure 5 is a plan view of a two piece mass spacer and air regulator member.

Figure 6 is a plan view of a cover member equipped to function as an air regulator.

Figure 7 is an edge view of the cover member shown in Figure 6.

In the drawings, 1 indicates the storage and preparer tube which is positioned vertically upon a pair of oppositely disposed legs 2 secured to the sides of the tube adjacent the bottom thereof, as at 3, the said tube being of sufficient length to project a convenient distance through and above the hay mow floor 4.

A pair of half round gate members 5 are hinged, one to each side of the bottom edge of the tube 1, by single hinged connections 6 positioned at diametrically opposite points. It will be observed that the gates are of such dimensions that their opposed straight edges fall short of engagement when the gates are closed, as indicated in Figure 1 of the drawings, or, in other words, the gates are so constructed and positioned that a small space will be provided between them when they are raised to the tube closing position.

To provide for suitably holding the gates to their closed or lifted positions and for effecting the desired release thereof from the mass supporting position, I provide each gate with a pair of lateral fingers 7 projecting from the side edges thereof, as shown in Figures 2 and 4 of the drawings. For cooperating with each of the gates, I provide a control lever 8 pivoted as at 9 to the respective tube side and which includes a back cut notch 10 in one edge thereof and which is adapted to receive the chain 11 which has its ends connected to the fingers 7 of the gate members 5.

When it is desired to fill the tube each gate member 5 is hand lifted to approximately its closed position and the respective lever 8 moved upwardly, the respective chain having been laid upon that lever previously so that as the lever is moved upwardly toward the side face of the tube the loop end of the chain will slide into the notch 10, the parts being so cooperatively positioned that when the lever has been swung all the way up into engagement with the side of the tube the same will hold the chain taut and secure the respective gate member to its closed position indicated in Figure 1 of the drawings, the relation of the pivot of the said lever with the points of contact of the chain with the fingers 7 and the notch 10 providing for a toggle lock which automatically holds the parts to the position stated.

The notch 10 in each lever is positioned relatively close to the pivot thereof, thereby providing for considerable leverage which greatly facilitates the locking of the gate member at its closed position or for reversing the lever action before described to effect a release of the gate and a portion of the mass supported thereby, it being understood that as the lever is swung downwardly the toggle connection which automatically held the gate member up is broken and the gate swings freely downwardly, the chain falling out of the slot 10 as the lever is dropped to a pendent position. This gate release may therefor be effected with a minimum of effort and in perfect safety.

If it is so desired, after a gate member has been released and is hanging pendently, the chain may be shortened sufficiently by slipping one of the lateral fingers 7 of the gate through a link at a shorter point, the gate member hand lifted to approximately the position illustrated in Figure 3 of the drawings, the shortened chain slipped into the notch 10—10 of the lever and the lever again elevated to the position indicated providing suitable toggle lock for automatically holding the parts to the position stated out of the way of a feeding action or cleaning of the discharged mass from beneath the discharge end of the tube.

I have discovered, in tube preparation of stock food, that the passage of air through the mass in the tube greatly facilitates the proper treatment thereof and the generation of heat which effects the desired predigestion. Thus I provide the hinged doors or gates 5 of a width that will provide a space between the meeting edges thereof when in the closed position and also so position the parts that when the gates are closed, as shown in Figure 1 of the drawings, a breather space will be provided also around the edges of the gate members.

It will be readily understood that my invention effects a great advance in facilitating the closing of the bottom of the tube during the filling of the mass thereinto by providing for passage of air through the tube and at the same time providing means for securely supporting the mass in a manner whereby the supporting elements may be easily released and all or a part of the mass allowed to discharge from the end of the tube without any danger whatever to the person charged with the responsibility of operating the device, when it is explained that according to the usual practice it has been necessary to build a support at each side of the tube suitable for laying a piece of 4 x 4 lumber across the bottom of each side of the tube about half way from the center thereof and then lay a sufficient number of small boards across the 4 x 4's to support the first filling of the mass. When the mass had been suitably filled and prepared and it was desired to use some of the same it was necessary to force out one of the 4 x 4's to allow a portion of the mass to feed down onto the floor. This is usually accomplished by sledge hammer blows and proved not only a difficult but a dangerous task in view of the fact that many hundreds of pounds of food are contained in the tube at a time. After a portion of the mass has been fed from one side of the tube, the 4 x 4 had to be returned to its original position and the other 4 x 4 similarly knocked out to allow a portion of the feed from the other side to be discharged. This side release is alternately accomplished until the contents of the tube have been discharged.

With the structure I have disclosed it is possible to discharge alternate sides and portions of the mass by alternately opening and closing the gate members 5 in the manner before described, this being accomplished with a minimum of effort and without any danger whatever to the operator.

It may be desired to position partition plates between portions of the mass and for this purpose I provide the partition members 12 which are in the nature of semicircular halves perforated as at 13 to permit free passage of air therethrough. These partition halves may be positioned at intervals through the length of the tube for dividing various types of food or for merely dividing the contents of the tube into sections, see Figure 5.

It may also be desirable to provide a top cover for the mass and for this purpose I provide the member 14 shown in Figures 6 and 7 of the drawings. The cover may comprise two superposed round sections perforated as at 15 and so held together that one of the sections may be rotated as at 15, by rotating the sections one upon the other means is provided for preventing or regulating passage of air through the said cover member.

While I have described and disclosed the use of chains 11 it should be understood that cables or ropes may be used if desired.

From the foregoing description, taken in connection with the accompanying drawings, it is thought the novel details of construction, the manner of operation and the advantages of my invention will be readily apparent to those skilled in the art to which it relates.

What I claim is:

1. A device of the class described comprising a tube having its top and bottom ends open, a pair of half-circular gates hinged to the bottom of the tube for controlling its open bottom end, devices including toggle lock connections for securing the gates to a tube end closing position and for releasing said gates from the tube end closing position, said connections including a separate lever for each gate hinged to the tube, and loop elements connected to the doors and detachably engaging the respective levers, all being arranged that each gate may be operated independently of the other.

2. A device of the class described comprising a tube having its top and bottom ends open, a pair of gates for controlling the open bottom of the tube, and individual means for operating each gate to secure the same alternately either to its tube end closing position or up against the outside of the tube.

3. A device of the class described comprising a tube having its top and bottom ends open, a pair of half-circular gates hinged to the bottom of the tube for controlling its open bottom end, a pair of fingers projecting laterally from each gate, a lever cooperative with each gate and pivoted to a side of the tube and having a notch in one edge thereof, and a chain for each gate adjustably connected at its ends to the projected fingers and having its loop placed in the respective lever notch whereby when the levers are moved up against the tube sides the gates will be held closed or up against the tube sides out of the way according to the adjusted length of the chains, the lever pivots being so positioned relatively to the notches and the chain end connections as to provide a toggle lock in either position.

WILSON R. MYERS.